United States Patent
Taniguchi et al.

(10) Patent No.: US 6,881,251 B2
(45) Date of Patent: Apr. 19, 2005

(54) INKJET INK COMPOSITION, METHOD FOR MANUFACTURING THE INKJET INK COMPOSITION AND IMAGE FORMING METHOD USING THE INKJET INK COMPOSITION

(75) Inventors: Keishi Taniguchi, Susono (JP); Shigeo Hatada, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 47 days.

(21) Appl. No.: 10/310,061

(22) Filed: Dec. 5, 2002

(65) Prior Publication Data

US 2003/0121446 A1 Jul. 3, 2003

(30) Foreign Application Priority Data

Dec. 26, 2001 (JP) ........................................ 2001-394425

(51) Int. Cl.$^7$ ........................... C09D 11/00; G01D 11/00
(52) U.S. Cl. ...................... 106/31.6; 106/401; 106/472; 347/100
(58) Field of Search ................................ 106/31.6, 401, 106/472; 347/100

(56) References Cited

U.S. PATENT DOCUMENTS

| 3,702,288 | A | * | 11/1972 | Erinjeri ........................ 204/488 |
| 4,013,481 | A | * | 3/1977 | Molls et al. ................. 106/503 |
| 5,306,687 | A | | 4/1994 | Furuya et al. |
| 5,328,754 | A | | 7/1994 | Yuyama et al. |
| 5,409,884 | A | | 4/1995 | Harada et al. |
| 5,447,900 | A | | 9/1995 | Suzaki et al. |
| 5,468,289 | A | * | 11/1995 | Herget et al. ................ 106/415 |
| 5,482,912 | A | | 1/1996 | Furuya et al. |
| 5,622,909 | A | | 4/1997 | Furuya et al. |
| 5,658,850 | A | | 8/1997 | Taniguchi et al. |
| 5,698,223 | A | * | 12/1997 | Mychajlowskij et al. ........................ 430/137.14 |
| 5,834,396 | A | | 11/1998 | Uemura et al. |
| 5,981,077 | A | | 11/1999 | Taniguchi |
| 5,994,020 | A | * | 11/1999 | Patel et al. ............. 430/137.14 |
| 6,004,391 | A | * | 12/1999 | Letschert et al. ........... 106/403 |
| 6,042,984 | A | | 3/2000 | Taniguchi |
| 6,063,835 | A | | 5/2000 | Ohshima et al. |
| 6,103,042 | A | | 8/2000 | Hatada et al. |
| 6,132,924 | A | * | 10/2000 | Patel et al. ............. 430/137.14 |
| 6,217,694 | B1 | | 4/2001 | Taniguchi |
| 6,284,349 | B1 | | 9/2001 | Hatada et al. |
| 6,309,734 | B1 | | 10/2001 | Taniguchi et al. |
| 6,316,080 | B1 | | 11/2001 | Hatada et al. |
| 6,348,519 | B1 | | 2/2002 | Ohshima et al. |
| 6,368,397 | B1 | * | 4/2002 | Ichizawa et al. ......... 106/31.65 |
| 2002/0096085 | A1 | * | 7/2002 | Gotoh et al. ............. 106/31.86 |
| 2003/0106462 | A1 | * | 6/2003 | Yatake et al. ............ 106/31.59 |

FOREIGN PATENT DOCUMENTS

| JP | 57-10660 | 1/1982 |
| JP | 57-10661 | 1/1982 |
| JP | 63-51485 | 3/1988 |
| JP | 63-56575 | 3/1988 |
| JP | 1-198671 | 8/1989 |
| JP | 2-255875 | 10/1990 |

\* cited by examiner

*Primary Examiner*—Mark L. Bell
*Assistant Examiner*—Veronica F. Faison
(74) *Attorney, Agent, or Firm*—Oblon, Spivak, McClelland, Maier & Neustadt, P.C.

(57) ABSTRACT

A method for manufacturing a composition including: mixing a basic material with a pigment dispersion including at least a pigment and water; and then subjecting the mixture of the basic material and pigment dispersion to a heat treatment. This composition is useful as an inkjet ink composition. An inkjet ink composition including at least pigment, water and a basic material, and has a pH of from 6.5 to 11.0 is also provided. An image forming method including discharging the composition from a nozzle to form an ink image on a receiving material is provided.

17 Claims, No Drawings

INKJET INK COMPOSITION, METHOD FOR MANUFACTURING THE INKJET INK COMPOSITION AND IMAGE FORMING METHOD USING THE INKJET INK COMPOSITION

BACKGROUND OF THE INVENTION

1. Field of the Invention

The present invention relates to a composition and particularly to an inkjet ink composition for use in ink jet printing. In addition, the present invention relates to a method for manufacturing the composition, and to an image forming method using the composition.

2. Discussion of the Background

As having been disclosed in published Japanese Patent Applications Nos. 63-51485, 63-56575 and 01-198671, inkjet inks, which are prepared by dissolving one or more water-soluble dyes in water or a mixture solvent including water and a water-soluble solvent and optionally adding an additive to the solution, have been mainly developed and used. However, these inkjet inks (hereinafter referred to as dye type inkjet inks) have the following drawbacks:

(1) recorded images have so poor water resistance as to be blurred when contacting water; and
(2) recorded images have poor light resistance such that when the recorded images are exposed to light, the color tones of the images change or the image density thereof decreases.

In attempting to solve these problems of the dye type inkjet inks, pigment type inkjet inks, which use one or more pigments (e.g., carbon black and organic pigments) instead of the dyes, have been disclosed in published Japanese Patent Applications Nos. 57-10660, 57-10661 and 02-255875.

When pigment type inkjet inks are used for inkjet printing, the resultant images, which have dried on a receiving material, have good water resistance. Therefore when the images contact water, the images do not blur (i.e., the images have good water resistance). This is because pigments do not dissolve in water. In addition, since the reactivity of pigments with light is lower than that of dyes, the images formed of pigment type inks have better light resistance than those formed of dye type inks.

Such pigment type inkjet inks are typically prepared by the following method:

(1) a mixture including one or more pigments, a dispersing medium and a dispersant is subjected to a dispersing treatment using a dispersing machine such as ball mills and sand mills; and
(2) the thus prepared pigment dispersion is optionally mixed with one or more additives to prepare a pigment type inkjet ink.

When the pigment dispersion for use in an inkjet ink includes pigment particles having a relatively large particle diameter, the nozzles from which the ink is to be discharged are clogged with the large pigment particles included in the resultant inkjet ink, resulting occurrence of a problem in that the ink is not discharged from the nozzles (hereinafter referred to as a clogging problem). In addition, when large pigment particles are present in the inkjet ink, image qualities of the recorded images, such as clearness, resolution and color reproducibility (i.e., transparency) deteriorate. Therefore, the pigment dispersion is typically prepared such that the pigment particles dispersed therein have a particle diameter not greater than 200 nm to prevent the clogging problem and to produce images having good clearness, color reproducibility (in particular, color reproducibility of secondary colors (i.e., overlaid color images)) and transparency.

Recently, self-dispersion type pigments which are prepared by chemically reacting the surface of a pigment with a specific functional group which can dissociate in water and which can be dispersed without using a dispersant have been practically used.

Since a specific group such as —COONa and —SO$_3$Na is chemically reacted with the surface of a pigment in such self-dispersion pigments, the self-dispersion pigments can be stably dispersed in water without a dispersant due to electrostatic repulsion of the functional group dissociated in water.

Black pigments such as carbon black, and yellow (Y), magenta (M) and cyan (C) color pigments such as Pigment Yellow 74, Pigment Red 122 and Pigment Blue 15:4 are preferably applied to the self-dispersion pigments.

However, both pigment type inkjet inks which use a pigment dispersion including a dispersant and pigment type inkjet inks which use a pigment dispersion including a self-dispersion pigment have a drawback in that the pH of the inks greatly changes (i.e., decreases) when the inks are preserved at 70° C. in a closed place.

If the degree of decrease in pH of an ink is large, a problem in that metal elements of an inkjet printer which contacts the inkjet ink and which are designed so as to be suitable for the original inkjet ink dissolve in or are corroded by the pH-changed inkjet ink occurs.

Because of these reasons, a need exists for a pigment type inkjet ink capable of producing good images without causing problems such as the clogging problem and pH changing problem even when used and preserved under various conditions.

SUMMARY OF THE INVENTION

Accordingly, an object of the present invention is to provide a composition (particularly a pigment type inkjet ink composition), which has good pH stability even when preserved at a high temperature.

Another object of the present invention is to provide a method for manufacturing the composition (the pigment type inkjet ink composition).

Yet another object of the present invention is to provide an image forming method by which images having good image qualities can be stably produced without causing a discharge problem such as the clogging problem even when the image forming ink is used or preserved under high temperature conditions.

Briefly these objects and other objects of the present invention as hereinafter will become more readily apparent can be attained by a method for manufacturing a composition (a pigment type inkjet ink composition), including:

mixing a basic material with a pigment dispersion including at least a pigment and water to prepare a basic material containing pigment dispersion; and then subjecting the basic material containing pigment dispersion to a heat treatment to control a pH thereof in a predetermined pH range to prepare a composition (a pigment type inkjet ink composition).

The method may further include the step of:

adding at least one of water and a water soluble organic solvent to the pigment type inkjet ink composition (i.e., the heat-treated basic material containing pigment dispersion).

The pH of the thus prepared composition (inkjet ink composition) hardly changes even after the inkjet ink composition is preserved under high temperature conditions because the acidic materials adsorbed on the surface of the pigment are neutralized by the basic material added. Therefore, a pigment type inkjet ink composition having an improved stability is provided.

The pigment content of the pigment dispersion is preferably from 5 to 30% by weight to prevent the pigment dispersion from having a high viscosity and to impart good dispersion stability to the resultant composition (inkjet ink composition).

The pigment content of the composition (inkjet ink composition) is preferably from 1 to 20% by weight to prevent the ink composition from having a high viscosity and to prepare a composition (an inkjet ink composition) capable of producing clear images.

The pigment preferably includes a pigment selected from the group consisting of carbon black, and color pigments. The pigment is preferably a self-dispersion pigment.

The basic material preferably includes a material selected from the group consisting of lithium hydroxide, sodium hydroxide, potassium hydroxide, and basic organic compounds. These basic materials are preferably added to the pigment dispersion as an aqueous solution thereof. By using these basic materials or the technique, the acidic materials adsorbed on the surface of the pigment can be well-neutralized, resulting in formation of a pigment type inkjet ink composition having good pH stability.

The heat treatment is preferably performed at a temperature from 30 to 95° C. to sufficiently dissolve the acidic materials adsorbed on the surface of the pigment in the ink composition to be neutralized, thereby preventing increase of the viscosity of the composition (inkjet ink composition).

The initial pH of the inkjet ink composition preferably ranges from 6.5 to 11 after the heat treatment.

The thus prepared composition (inkjet ink composition) preferably has a final pH not less than 6.5 even after being preserved in a closed place at 70° C. In addition, the ratio of the final pH of the composition (inkjet ink composition) after the preservation test to the initial pH thereof before the preservation test is preferably not less than 0.90 (i.e., 90%). By using the thus prepared inkjet ink composition, the problem in that the inkjet ink composition corrodes the members of inkjet printers, which members contact the inkjet ink composition, can be prevented.

In this regard, the "initial pH" is defined as the pH of the composition measured just after making the composition. The "final pH" is defined as a certain pH of the composition obtained after subjecting the composition to a heat-treatment test of 70° C. for 3 weeks.

The average particle diameter of the pigment dispersed in the thus prepared inkjet ink composition is preferably from 20 to 200 nm to prevent occurrence of the clogging problem.

In another aspect of the present invention, an inkjet ink composition is provided which includes at least a pigment, water and a basic material and which has a pH of from 6.5 to 11. The inkjet ink composition preferably has a pH not less than 6.5 even after being preserved in a closed place at 70° C. for 3 weeks. It is preferable that the final pH of the inkjet ink composition after the preservation test (i.e., the preservation at 70° C. for 3 weeks) to the initial pH of the ink composition before the preservation test is not less than 0.90. The ink composition is preferably prepared by one of the methods mentioned above.

The ink composition has good pH stability even when used or preserved at high temperature conditions for a long period of time.

In yet another aspect of the present invention, an image forming method is provided which includes the step of:

discharging an ink from a nozzle to form an image on a receiving material to form an ink image thereon, wherein the ink is the composition (inkjet ink composition) of the present invention.

By using this image forming method, clear images can be formed on the receiving material without causing a problem in that the ink corrodes the members of the inkjet printer used.

These and other objects, features and advantages of the present invention will become apparent upon consideration of the following description of the preferred embodiments of the present invention.

DETAILED DESCRIPTION OF THE INVENTION

The composition (pigment type inkjet ink composition) of the present invention is prepared by mixing a basic material with a pigment dispersion including at least a pigment and water or a pigment ink liquid including a pigment dispersion and at least one of a water soluble organic solvent and an additive such as surfactants, pH adjusters, antiseptics and resins to prepare a basic material containing pigment ink dispersion (or a basic material containing pigment ink liquid); then subjecting the basic material containing pigment dispersion to a heat treatment to control the pH thereof in a predetermined range (6.5 to 11) to prepare a heat-treated basic material containing liquid dispersion; and then optionally adding water and/or a water soluble organic solvent thereto. The thus prepared inkjet ink composition has good pH stability (i.e., good preservation stability) even when used or preserved under high temperature conditions.

In the present application, the pigment dispersion is defined as a dispersion including at least a pigment and water, and optionally an additive such as dispersants. The pigment ink liquid is defined as a liquid including at least a pigment dispersion, and at least one of a water soluble organic solvent and an additive such as surfactants, pH adjusters, antiseptics and resins.

A basic material containing pigment dispersion is defined as a pigment dispersion which is mixed with a basic material. A basic material containing pigment ink liquid is defined as a pigment ink liquid which is mixed with a basic material.

A heat treated basic material containing pigment dispersion is defined as a basic material containing pigment dispersion which is subjected to a heat treatment. A heat treated basic material containing pigment ink liquid is defined as a basic material containing pigment ink liquid which is subjected to a heat treatment.

The present invention will be explained in detail.

The reason why the pH of conventional pigment type inkjet ink compositions decreases particularly when the ink compositions are preserved under high temperature conditions is considered to be that the acidic impurities adsorbed on the surface of primary particles of the pigment therein gradually dissolve in the ink.

In general, the particles of a pigment included in a pigment dispersion for use in an inkjet ink composition are secondary particles which are aggregation of from a few to a few hundred primary particles and which have an average particle diameter of from 20 to 200 nm. A large number of surfaces of such primary particles are present inside the secondary particles.

In general, the acidic impurities present on such surfaces of the primary particles, which impurities are included in raw materials of the pigment or which are generated during pigment production processes, hardly contact the liquid components of the ink composition. Even when the acidic impurities contact the liquid components of the ink composition, the liquid components hardly flow. Therefore, the acidic impurities hardly dissolve into the ink composition.

However, when such ink composition is preserved at a high temperature for a certain time or more, the water molecules in the ink composition actively move and invade into the secondary particles. Therefore the acidic materials present inside the secondary particles, which hardly dissolve into the ink composition under normal conditions, dissolve into the ink composition, resulting in decrease of the pH of the ink composition.

In view of this point, it is important that the acidic impurities adsorbed on the surfaces of the primary pigment particles are previously dissolved into the ink and neutralized, in order to prevent decrease of the pH of the ink composition or lower the degree of decrease of the pH even after the ink composition is preserved under high temperature conditions.

In particular, it is preferable that the ink composition is prepared as follows:
(1) a pigment dispersion or a pigment ink liquid is mixed with a basic material to prepare an ink composition; and
(2) the basic material containing pigment dispersion or a basic material containing pigment ink liquid is subjected to a heat treatment to prepare a heat-treated basic material containing pigment dispersion or basic material containing pigment ink liquid (i.e., an inkjet ink composition if a material such as water and water soluble organic material is not further added thereto) having a pH in a predetermined range.

The thus prepared inkjet ink composition does not cause the above-mentioned pH decrease problem.

The pigment in the pigment dispersion or the pigment ink liquid for use in the inkjet ink composition of the present invention is not particularly limited, and the following known black and colored pigments can be exemplified.

Specific examples of such black pigments include carbon blacks such as furnace black, lamp black, acetylene black and channel black; powders including one or more metals such as copper powders, iron powders and titanium oxide powders; and organic pigments such as o-nitroaniline black and the like.

Specific examples of the yellow pigments include Pigment Yellows 1, 2, 3, 12, 13, 14, 16, 17, 73, 74, 75, 83, 93, 95, 97, 98, 114, 120, 128, 129, 138, 150, 151, 154, 155, 180, etc.

Specific examples of the magenta pigments include Pigment Reds 5, 7, 12, 48 (Ca), 48 (Mn), 57 (Ca), 57:1, 112, 122, 123, 168, 184, 202, etc.; Pigment Violet 19; etc.

Specific examples of the cyan pigments include Pigment Blue 1, 2, 3, 15, 15:3, 15:4, 16, 22 and 60; Vat Blue 4 and 60; etc.

Specific examples of other color pigments include toluidine red, Permanent Carmine FB, Fast Yellow AAA, Disazo Orange PMP, Lake Red C, Brilliant Carmine 6B, Phthalocyanine Blue, Quinacridone Red, Dioxane Violet, Victoria Pure Blue, Alkali Blue Toner, Fast Yellow 10G, Disazo Yellow AAMX, Disazo Yellow AAOT, Disazo Yellow AAOA, yellow iron oxide, Disazo Yellow HR, o-nitroaniline orange, dinitroaniline orange, Vulcan Orange, chlorinated Para Red, Brilliant Fast Scarlet, Naphthol Red 23, Pyrazolone red, Barium Red 2B, Calcium Red 2B, Strontium Red 2B, Manganese Red 2B, Barium Rithol Red, Pigment Scarlet 3B Lake, Lake Bordeaux 10B, Anthocyne 3B Lake, Anthocyne 5B Lake, Rhodamine 6G Lake, Eosin Lake, red iron oxide, Fanatol Red FGR, Rhodamine B Lake, Methyl Violet Lake, dioxazine violet, Basic Blue 5B Lake, Basic Blue 6G Lake, Fast Sky Blue, Alkali Blue R Toner, Peacock Blue Lake, Prussian Blue, ultramarine blue, Reflex Blue 2G, Reflex Blue R, Brilliant Green Lake, Diamond Green, Thioflavine Lake, Phthalocyanine Green G, Green Gold, Phthalocyanine Green Y, iron oxide powders, red rust, zinc oxide, titanium oxide, calcium carbonate, clay, barium sulfate, alumina, alumina white, aluminum powders, bronze powders, fluorescent pigments, pearl pigments, Naphthol Carmine FB, Naphthol Red M, Fast Yellow G, Disazo Yellow AAA, dioxane violet, Alkali Blue G Toner and the like. In addition, process pigments which are prepared by grafting a resin on a pigment can also 1.0 be used. These pigments can be used alone or in combination.

Among these pigments, carbon blacks, Pigment Yellow 74, Pigment Red 122 and Pigment Blues 15:3 are preferably used as a black color pigment, a yellow color pigment, a magenta color pigment and a cyan color pigment, respectively, because of having good dispersion stability, color reproducibility and light resistance.

The pigment dispersion for use in the inkjet ink composition of the present invention includes at least one or more pigments and water as essential components and optionally includes a water soluble organic solvent and an additive such as dispersants. The mixture is dispersed with a dispersing machine such as sand mills, pearl mills, DYNO mills, ball mills, roll mills, nanomizers, and homogenizers.

The pigment ink liquid for use in the pigment type inkjet ink composition of the present invention is typically prepared by optionally adding water, a water soluble organic solvent and/or an additive such as surfactants to the above-mentioned pigment dispersion and mixing them to impart desired properties to the resultant ink.

The pigment type inkjet ink composition of the present invention is typically prepared by a method in which a basic material is added to the pigment dispersion mentioned above; and the mixture is subjected to a heat treatment to adjust the pH thereof.

Alternatively, the pigment type inkjet ink composition can be prepared by a method in which a basic material is added to the pigment ink liquid mentioned above; and the mixture is subjected to a heat treatment to adjust the pH thereof.

After the heat treatment, the resultant pigment type inkjet ink composition is typically subjected to a filtering treatment using a screen or a centrifugal separator to remove large particles therefrom, which is followed by a deaeration treatment, if desired.

The above-mentioned pigment dispersion may include a water soluble organic solvent.

Specific examples of such water soluble organic solvents for use in the pigment dispersion and pigment ink liquid mentioned above include alcohols having from 1 to 4 carbon atoms such as methyl alcohol, ethyl alcohol, n-propyl alcohol, isopropyl alcohol, n-butyl alcohol, sec-butyl alcohol and tert-butyl alcohol: amides such as dimethylformamide and dimethylacetamide; ketones or ketone alcohols such as acetone and diacetone alcohol; ethers such as tetrahydrofuran and dioxane; polyhydric alcohols such as ethylene glycol, propylene glycol, 1,2-propanediol, 1,2-butanediol, 1,3-butanediol, 1,4-butanediol, diethyleneglycol, triethyleneglycol, 1,2,6-hexanetriol, thiodiglycol, hexyleneglycol, and glycerin; polyalkylene glycols such as polyethylene glycol and polypropylene glycol; alkyl ethers of a polyhydric alcohol, such as ethylene glycol monomethyl ether, ethylene glycol monoethyl ether, triethylene glycol monomethyl ether and triethylene glycol monoethyl ether; alkanol amines such as monoethanol amine, diethanol amine and triethanol amine; and other solvents such as N-methyl-2-pyrrolidone, 2-pyrrolidone and 1,3-dimethyl-2-imidazolydinone.

Among these water-soluble solvents, glycerin, diethylene glycol and 1,3-butanediol are preferably used.

In addition, polyhydric alcohols such as diethylene glycol, and lower alkyl ethers of a polyhydric alcohol such as triethylene glycol monomethyl ether and triethylene glycol monoethyl ether are preferably used for the pigment ink liquid mentioned above for use in the inkjet ink composition of the present invention.

The content of the water soluble organic solvent in pigment type inkjet ink composition of the present invention is preferably not greater than 50% by weight in view of environmental protection.

In order to prepare a self-dispersion pigment, a pigment such as pigments mentioned above is subjected to a chemical treatment such that one or more functional groups are connected with the surface of the pigment in a desired amount. Thus, a self-dispersion pigment which can be stably dispersed in water while the particles repulse each other due to electrostatic repulsion thereof.

Methods for manufacturing a self-dispersion pigment have been disclosed in U.S. Pat. Nos. 5,571,311, 5,630,868 and 5,707,432; J. E. Johnson, Imaging Science and technology's 50th Annual Conference (1997); Yuan Yu, Imaging Science and technology's 53th Annual Conference (2000); and Polyfile, 12 48(1996), incorporated by reference.

The pigment particles dispersed in the pigment dispersion, pigment ink liquid and inkjet ink composition preferably have an average particle diameter of from 20 nm to 200 nm and more preferably from 20 to 100 nm. When the average particle diameter is greater than 200 nm, the clogging problem tends to occur in inkjet printing nozzles, and in addition clear color images cannot be obtained. To the contrary, when the average particle diameter is less than 20 nm, the preservability of the inkjet ink and the light resistance of the resultant recorded images tend to deteriorate. Further, the manufacturing costs of the pigment dispersion, pigment ink liquid and inkjet ink composition increase because it takes a long time to prepare a pigment dispersion (or a pigment ink liquid) including such small pigment particles. In the present invention, the average particle diameter of a pigment is measured by an instrument, MICROTRACK UPA manufactured by Nikkiso Co., Ltd.

The pigment content of the pigment dispersion is preferably from 5 to 30% by weight, and more preferably from 10 to 20% by weight. When the pigment content is too low, the productivity of the pigment dispersion is low. In contrast, when the pigment content is too high, the resultant dispersion has too high viscosity, and thereby it becomes difficult to disperse the pigment dispersion.

The pigment content of the pigment ink liquid, which depends on the pigment used, is preferably from 3 to 20% by weight, and more preferably from 3 to 15% by weight.

The pigment content of the inkjet ink composition of the present invention is preferably from 1 to 20% by weight, and more preferably from 2 to 15% by weight. When the pigment content is too low, the resultant printed images has low image density, and therefore clear color images cannot be obtained. To the contrary, when the pigment content is too high, the viscosity of the resultant inkjet ink tends to increase. In addition, the clogging problem tends to occur.

Suitable basic material to be added to the pigment dispersion or the pigment ink liquid for use in the ink composition of the present invention include alkali compounds such as hydroxides of an alkali metal and hydroxides of an alkali earth metal; organic basic compounds such as aliphatic amines and aromatic amines; etc., but are not limited thereto.

Among these materials, lithium hydroxide (anhydrate or hydrate), sodium hydroxide and potassium hydroxide are preferably used because of exerting good effects even at a low concentration.

In addition, among the basic organic compounds, monoethanol amine, diethanol amine, triethanol amine, aminomethyl propanol and choline are preferably used.

When a basic material is added to a pigment dispersion or an ink, it is preferable that the basic material is preliminarily dissolved in water to prepare a solution of the basic material. The solution of the basic material is added to the pigment dispersion or pigment ink liquid. When a basic material is directly added to a pigment dispersion or a pigment ink liquid, the pH of a portion of the pigment dispersion or pigment ink liquid locally increases for a short period of time, and thereby problems in that the pigment dispersion or pigment ink liquid is damaged (coagulation or the like) and viscosity of the pigment dispersion or ink seriously increases occur.

After mixed with a basic material, the dispersion or pigment ink liquid is subjected to a heat treatment. The temperature of the heat treatment is preferably from 30 to 95° C., more preferably from 40 to 90° C., and even more preferably from 50 to 80° C. When the temperature is too low, it takes a long time to dissolve the acidic materials, which are adsorbed on the surface of the primary pigment particles inside the secondary pigment particles of the pigment used, into the resultant ink composition, and thereby it takes a long time to neutralize the acidic materials.

In contrast, when the temperature is too high, problems in that the pigment dispersion or pigment ink liquid is damaged (occurrence of coagulation or the like) and the viscosity of the pigment dispersion or pigment ink liquid seriously increases occur.

The time of the heat treatment, which is determined depending on the heating temperature, the amount of the acidic materials included in the pigment dispersion or pigment ink liquid, and the species of the basic material to be added, is typically from 30 minutes to 1 month, preferably from 1 hour to 3 weeks, and more preferably from 3 hours to 2 weeks.

When the treating time is too short, the acidic materials adsorbed on the surface of the primary pigment particles inside the secondary pigment particles are insufficiently dissolved in the resultant ink composition, and thereby a problem in that the pH of the produced inkjet ink composition decreases after long term use or preservation. When the treating time is too long, not only the productivity of the inkjet ink composition deteriorates but also the viscosity of the inkjet ink composition (i.e., the pigment dispersion or ink to which a basic material has been added) seriously increases.

The pH of the inkjet ink composition after the heat treatment is preferably from 6.5 to 11, more preferably from 7.0 to 10 and even more preferably from 7.5 to 9.5. When the pH is too low, it is likely that members of the inkjet printer, which contact the ink, are corroded. To the contrary, when the pH is too high, the ink is dangerous to handle because of being highly basic.

The ratio of the pH of the thus prepared pigment type inkjet ink composition after preserved at 70° C. for 3 weeks to the initial pH of the thus prepared pigment type inkjet ink composition before the preservation test is preferably not less than 90%, more preferably not less than 95% and even more preferably not less than 98%. That the ratio is too low means that the acidic materials adsorbed on the surface of the primary particles of the pigment used are insufficiently dissolved into the ink even after the heat treatment. Namely, such resultant inkjet ink composition has poor preservability.

The inkjet ink composition of the present invention is typically prepared by any one of the methods mentioned above. However, it is possible to further add a basic material or an acidic material after performing the heat treatment, to finally adjust the pH of the inkjet ink composition.

The inkjet ink composition of the present invention can be used for continuously-projecting type inkjet printing methods and on-demand type inkjet printing methods. The on-demand type inkjet printing methods include piezoelectric inkjet recording methods, thermal inkjet recording methods and electrostatic inkjet recording methods.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Example 1

The following components were mixed to prepare a pigment ink liquid (1) for use in a pigment type inkjet ink composition.

| Formula of pigment ink liquid (1) for pigment type inkjet ink composition | |
|---|---|
| Glycerin | 80 |
| Diethylene glycol | 240 |
| 2-pyrrolidone | 30 |
| 2-ethyl-1,3-hexanediol | 30 |
| Antiseptic (PROXEL LV(S), solid content of 20%) | 3 |
| Distilled water | 436 |
| Self-dispersion carbon black | 600 |

(CAB-O-JET300 manufactured by CABOT CORP., average particle diameter of 136 nm and pigment content of 15% by weight)

Then 80 parts of a 1% aqueous solution of lithium hydroxide (monohydrate) were added to the pigment ink liquid (1) drop by drop while the mixture was agitated to prepare an inkjet ink composition (1a) (i.e., a basic material containing pigment ink liquid (1)). The pH of the inkjet ink composition (1a) was 10.91.

The thus prepared inkjet ink composition (1 a) was contained in a polyethylene container and then the container was sealed. The inkjet ink composition (1a) in the container was set in an oven heated at 70° C. to be subjected to a heat treatment. When the inkjet ink composition (1a) was heat-treated while the pH thereof was measured, the pH gradually decreased over a period of time. After the inkjet ink composition (1a) was subjected to the heat treatment for 7 days, the inkjet ink composition (1a) was taken out from the oven. The pH thereof was 8.19.

The heat-treated inkjet ink composition (1a) was then subjected to a filtering treatment using PROFILE II manufactured by Nihon Pall Ltd. and having openings of 1.0 μm. Thus, a final inkjet ink composition (1b) was prepared. The average particle diameter of the carbon black in the inkjet ink composition (1b) was 138 nm and the pH thereof was 8.20.

When the pH of the final inkjet ink composition (1b) was measured after the final inkjet ink composition (1b) was preserved at 70° C. for 3 weeks while contained in a sealed container, the pH was 7.88. The pH ratio was 96% (i.e., 7.88/8.19).

Comparative Example 1

The procedure for preparation of the inkjet ink composition (1b) in Example 1 was repeated except that the 1% aqueous solution of lithium hydroxide was not added and the heat treatment for 7 days at 70° C. was not performed. Thus, a comparative inkjet ink composition (1) was prepared. The average particle diameter of the carbon black in the comparative inkjet ink composition (1) was 136 nm, and the pH thereof was 7.80.

When the pH of the comparative inkjet ink composition (1) was measured after the comparative inkjet ink composition (1) was preserved at 70° C. for 3 weeks while contained in a sealed container, the pH was 6.47. The pH ratio was 83% (i.e., 6.47/7.80).

Comparative Example 2

The procedure for preparation of the inkjet ink composition (1b) in Example 1 was repeated except that the 1% aqueous solution of lithium hydroxide was not added, the heat treatment for 7 days at 70° C. was not performed and a 10% aqueous solution of sodium hydroxide was added thereto to control the pH thereof so as to be 8.17. Thus, a comparative inkjet ink composition (2) was prepared. The average particle diameter of the carbon black in the comparative inkjet ink composition (2) was 136 nm.

When the pH of the comparative inkjet ink composition (2) was measured after the comparative inkjet ink composition (2) was preserved at 70° C. for 3 weeks while contained in a sealed container, the pH was 6.70. The pH ratio was 82% (i.e., 6.70/8.17).

Example 2

The procedure for preparation of the inkjet ink composition (1a) in Example 1 was repeated except that the addition amount of the 1% aqueous solution of lithium hydroxide was changed from 80 parts to 110 parts. Thus an inkjet ink composition (2a) (i.e., a basic material containing pigment ink liquid) was prepared. The pH of the inkjet ink composition (2a) was 11.46.

The thus prepared inkjet ink composition (2a) was contained in a polyethylene container and then the container was sealed. The inkjet ink composition (2a) in the container was set in an oven heated at 80° C. to be subjected to a heat treatment. When the inkjet ink composition (2a) was heat-treated while the pH thereof was measured, the pH gradually decreased over a period of time. After the inkjet ink composition (2a) was subjected to the heat treatment for 16days, the inkjet ink composition (2a) was taken out from the oven. The pH thereof was 8.36.

The heat-treated inkjet ink composition (2a) was then subjected to a filtering treatment using PROFILE II manufactured by Nihon Pall Ltd. and having openings of 1.0 μm. Thus a final inkjet ink composition (2b) was prepared. The average particle diameter of the carbon black in the inkjet ink composition (2b) was 140 nm and the pH thereof was 8.37.

When the pH of the final inkjet ink composition (2b) was measured after the final inkjet ink composition (2b) was preserved at 70° C. for 3 weeks while contained in a sealed container, the pH was 8.24. The pH ratio was 98.4% (i.e., 8.24/8.37).

Example 3

Twenty (20) parts of a 10% aqueous solution of sodium hydroxide were added drop by drop to the following pigment dispersion (1) while the mixture was agitated to prepare a basic material containing pigment dispersion (3a) (hereinafter referred to as a dispersion (3a)). The pH of the dispersion (3a) was 10.50.

| Formula of inkjet ink composition (3a) | |
|---|---|
| Glycerin | 80 |
| Diethylene glycol | 240 |
| 2-pyrrolidone | 30 |
| 2-ethyl-1,3-hexanediol | 30 |
| Antiseptic (PROXEL LV(S), solid content of 20%) | 3 |
| Distilled water | 436 |
| Dispersion (3b) | 600 |

(CAB-O-JET300 manufactured by CABOT CORP., average particle diameter of 136 nm and pigment content of 15% by weight)

The thus prepared dispersion (3a) was contained in a polyethylene container and then the container was sealed.

The dispersion (3a) in the container was set in an oven heated at 50° C. to be subjected to a heat treatment. When the pigment dispersion (3a) was heat-activated while the pH thereof was measured, the pH gradually decreased over a period of time. After the dispersion (3a) was subjected to the heat treatment for 5 days, the dispersion (3a) was taken out from the oven. Thus, the dispersion (3a) was heat-treated (hereinafter this heat-treated dispersion (3a) is referred to as a dispersion (3b)).

The pH of the dispersion (3b) was 8.23 and the average particle diameter of the carbon black therein was 151 nm.

Then the following components were mixed to prepare an inkjet ink composition (3a).

| Formula of pigment dispersion (1) for pigment type inkjet ink composition | |
| --- | --- |
| Self-dispersion carbon black | 600 |

The inkjet ink composition (3a) was subjected to a filtering treatment using PROFILE II manufactured by Nihon Pall Ltd. and having openings of 1.0 μm. Thus a final inkjet ink composition (3a) was prepared. The average particle diameter of the carbon black in the final inkjet ink composition (3a) was 150 nm and the pH thereof was 8.26.

When the pH of the final inkjet ink composition (3a) was measured after the inkjet ink composition (3a) was preserved at 70° C. for 3 weeks while contained in a sealed container, the pH was 7.59. The pH ratio was 92% (i.e., 7.59/8.26).

Example 4

The following components were mixed to prepare a pigment ink liquid (2) for use in a pigment type inkjet ink composition.

| Formula of pigment ink liquid (2) for pigment type inkjet ink composition | |
| --- | --- |
| Glycerin | 80 |
| Diethylene glycol | 240 |
| 2-ethyl-1,3-hexanediol | 30 |
| Antiseptic (PROXEL LV(S), solid content of 20%) | 3 |
| Distilled water | 436 |
| Self-dispersion magenta pigment | 600 |

(IJX-266 manufactured by CABOT, average particle diameter of 109.5 nm and pigment content of 14.3% by weight)

Then 70 parts of a 1% aqueous solution of lithium hydroxide (monohydrate) were added to the pigment ink liquid (2) drop by drop while the mixture was agitated to prepare an inkjet ink composition (4a) (i.e., a basic material containing pigment ink liquid (2)). The pH of the inkjet ink composition (4a) was 10.01.

The thus prepared inkjet ink composition (4a) was contained in a polyethylene container and then the container was sealed. The inkjet ink composition (4a) in the container was set in an oven heated at 70° C. to be subjected to a heat treatment. When the inkjet ink composition (4a) was heat-treated while the pH thereof was measured, the pH gradually decreased over a period of time. After the inkjet ink composition (4a) was subjected to the heat treatment for 9 days, the inkjet ink composition (4a) was taken out from the oven. The pH thereof was 7.71.

The heat-treated inkjet ink composition (4a) was then subjected to a filtering treatment using PROFILE II manufactured by Nihon Pall Ltd. and having openings of 1.0 μm. Thus a final inkjet ink composition (4b) was prepared. The average particle diameter of the magenta pigment in the inkjet ink composition (4b) was 112 nm and the pH thereof was 7.71.

When the pH of the final inkjet ink composition (4b) was measured after the final ink composition (4b) was preserved at 70° C. for 3 weeks while contained in a sealed container, the pH was 7.56. The pH ratio was 98% (i.e., 7.56/7.71).

Comparative Example 3

The procedure for preparation of the final inkjet ink composition (4b) in Example 4 was repeated except that the 1% aqueous solution of lithium hydroxide was not added and the heat treatment for 9 days at 70° C. was not performed. Thus, a comparative inkjet ink composition (3) was prepared. The average particle diameter of the magenta pigment in the comparative inkjet ink composition (3) was 110 nm, and the pH thereof was 7.70.

When the pH of the comparative inkjet ink composition (3) was measured after the comparative inkjet ink composition (3) was preserved at 70° C. for 3 weeks while contained in a sealed container, the pH was 5.89. The pH ratio was 76% (i.e., 5.89/7.70).

Example 5

The following components were mixed to prepare a pigment ink liquid (3) for use in a pigment type inkjet ink composition.

| Formula of pigment ink liquid (3) for pigment type inkjet ink composition | |
| --- | --- |
| Glycerin | 80 |
| Diethylene glycol | 240 |
| 2-pyrrolidone | 30 |
| 2-ethyl-1,3-hexanediol | 30 |
| Antiseptic (PROXEL LV(S), solid content of 20%) | 3 |
| Distilled water | 436 |
| Self-dispersion carbon black | 600 |

(LIOJET BLACK BASE manufactured by Toyo Ink Mfg. Co., Ltd., average particle diameter of 71.8 nm and pigment content of 16.6% by weight)

Then 50 parts of a 1% aqueous solution of lithium hydroxide (monohydrate) were added to the pigment ink liquid (3) drop by drop while the mixture was agitated to prepare an inkjet ink composition (5a). The pH of the inkjet ink composition (5a) was 11.55.

The thus prepared inkjet ink composition (5a) was contained in a polyethylene container and then the container was sealed. The inkjet ink composition (5a) in the container was set in an oven heated at 70° C. to be subjected to a heat treatment. When the inkjet ink composition (5a) was heat-treated while the pH thereof was measured, the pH gradually decreased over a period of time. After the inkjet ink composition (5a) was subjected to the heat treatment for 14 days, the inkjet ink composition (5a) was taken out from the oven. The pH thereof was 8.20.

The heat-treated inkjet ink composition (5a) was then subjected to a filtering treatment using PROFILE II manufactured by Nihon Pall Ltd. and having openings of 1.0 μm. Thus a final inkjet ink composition (5b) was prepared. The average particle diameter of the magenta pigment in the final inkjet ink composition (5b) was 75.2 nm and the pH thereof was 8.21.

When the pH of the inkjet ink composition (5b) was measured after the final inkjet ink composition (5b) was preserved at 70° C. for 3 weeks while contained in a sealed container, the pH was 7.55. The pH ratio was 92% (i.e., 7.55/8.21).

Comparative Example 4

The procedure for preparation of the inkjet ink composition (5b) in Example 5 was repeated except that the 1% aqueous solution of lithium hydroxide was not added and the heat treatment for 14 days at 70° C. was not performed. Thus, a comparative inkjet ink composition (4) was prepared. The average particle diameter of the carbon black in the comparative inkjet ink composition (4) was 72 nm, and the pH thereof was 8.12.

When the pH of the comparative inkjet ink composition (4) was measured after the comparative inkjet ink composition (4) was preserved at 70° C. for 3 weeks while contained in a sealed container, the pH was 5.60. The pH ratio was 69% (i.e., 5.60/8.12).

Example 6

The procedure for preparation of the inkjet ink composition (1a) in Example 1 was repeated except that the 1% aqueous solution of lithium hydroxide of 80 parts was replaced with 15 parts of a 15.8% aqueous solution of choline. Thus an inkjet ink composition (6a) was prepared. The pH of the inkjet ink composition (6a) was 11.02.

The thus prepared inkjet ink composition (6a) was contained in a polyethylene container and then the container was sealed. The inkjet ink composition in the container was set in an oven heated at 70° C. to be subjected to a heat treatment. When the inkjet ink composition was heat-treated while the pH thereof was measured, the pH gradually decreased over a period of time. After the inkjet ink composition (6a) was subjected to the heat treatment for 12 days, the inkjet ink composition (6a) was taken out from the oven. The pH thereof was 8.40.

The heat-treated inkjet ink composition (6a) was then subjected to a filtering treatment using PROFILE II manufactured by Nihon Pall Ltd. and having openings of 1.0 $\mu$m. Thus, a final inkjet ink composition (6b) was prepared. The average particle diameter of the carbon black in the inkjet ink composition (6b) was 138 nm and the pH thereof was 8.40.

When the pH of the final inkjet ink composition (6b) was measured after the final inkjet ink composition (6b) was preserved at 70° C. for 3 weeks while contained in a sealed container, the pH was 7.64. The pH ratio was 91% (i.e., 7.64/8.40).

As mentioned above, the thus prepared inkjet ink compositions (1b) to (6b) in Examples 1 to 6 have good pH stability (i.e., the pH ratio is not less than 90%) even when the inkjet ink compositions are preserved at 70° C. for 3 weeks. Therefore, the inkjet ink compositions do not corrode metallic members of the inkjet printers for which the inkjet ink compositions are used. To the contrary, the comparative inkjet ink compositions (1) to (4) have poor pH stability (i.e., the pH ratio is low) when the comparative inkjet ink compositions are preserved at 70° C. for 3 weeks. Therefore, the comparative inkjet ink compositions cause a problem in that metallic members of the inkjet printers for which the inkjet ink compositions are used are corroded.

The ink discharging property of each of inkjet ink compositions (1b) to (6b) before and after the preservation test for 3 weeks at 70° C. was evaluated as follows.

Each inkjet ink composition was set in each of printers, MJ-930C manufactured by Seiko Epson Corp. and using a piezoelectric inkjet recording method, and DESK JET 880C manufactured by Hewlett-Packard Co. and using a thermal inkjet recording method to evaluate the ink discharging property of the inkjet ink compositions.

As a result, each of the inkjet ink compositions was stably discharged from nozzles without causing the clogging problem.

Effects of the Present Invention

As can be understood from the above description, the pigment type inkjet ink composition of the present invention has good stability (such as pH stability) even when preserved under high temperature conditions. Therefore the inkjet ink composition can be stably discharged from inkjet printers, thereby stably forming images having good image qualities.

Additional modifications and variations of the present invention are possible in light of the above teachings. It is therefore to be understood that within the scope of the appended claims the invention may be practiced other than as specifically described herein.

This document claims priority and contains subject matter related to Japanese Patent Application No. 2001-394425, filed on Dec. 26, 2001, the entire contents of which are herein incorporated by reference.

What is claimed as new and desired to be secured by Letters Patant of the United State is:

1. A method for manufacturing a composition comprising:
   mixing a basic material with a pigment dispersion comprising at least one surface-treated pigment, at least one water-soluble organic solvent and water to form a mixture; and
   then subjecting the mixture of the basic material and pigment dispersion to a heat treatment.

2. The method according to claim 1, further comprising:
   adding at least water and the water soluble organic solvent to the mixture after the heat treatment.

3. The method according to claim 1, wherein the pigment dispersion further comprises an additive selected from the group consisting of surfactants, pH adjusters, antiseptics and resins.

4. The method according to claim 1, wherein the surface-treated pigment is present in the pigment dispersion in an amount of from 5 to 30% by weight based on the total weight of the pigment dispersion.

5. The method according to claim 1, wherein the surface-treated pigment is present in the composition in an amount of from 1 to 20% by weight based on the total weight of the composition.

6. The method according to claim 1, wherein the surface-treated pigment comprises at least one pigment selected from the group consisting of carbon blacks and color pigments.

7. The method according to claim 1, wherein the surface-treated pigment comprises a self-dispersion pigment.

8. The method according to claim 1, wherein the basic material comprises at least one material selected from the group consisting of lithium hydroxide, sodium hydroxide and potassium hydroxide.

9. The method according to claim 1, wherein the basic material comprises a basic organic compound.

10. The method according to claim 1, wherein the mixing comprises:
    mixing an aqueous solution of a basic material with a pigment dispersion comprising at least one surface-treated pigment, at least one water soluble organic solvent and water.

11. The method according to claim 1, wherein the heat treatment comprises:
    subjecting the mixture of the basic material and the pigment dispersion to a heat treatment at a temperature of from 30 to 95° C.

12. The method according to claim 1, wherein the heat treatment comprises:
    subjecting the mixture of the basic material and the pigment dispersion to a heat treatment so that the mixture has an initial pH of from 6.5 to 11.

13. The method according to claim 12, wherein the composition has a final pH not less than 6.5 after being heated at 70° C. for 3 weeks.

14. The method according to claim 13, wherein a ratio of the final pH to the initial pH is not less than 0.90.

15. The method according to claim 1, wherein the surface-treated pigment in the composition has an average particle diameter of from 20 nm to 200 nm.

16. The method of claim 1, wherein the surface-treated pigment has at least one of —COONa or —SO$_3$Na groups chemically reacted with the surface of the pigment.

17. The method of claim 1, wherein heat treatment comprises heating the mixture at a temperature of from 50 to 80° C. for from 3 hours to 2 weeks.

* * * * *